(No Model.)

E. C. STRANGE.
COMBINED VISE AND DRILL.

No. 373,539. Patented Nov. 22, 1887.

WITNESSES.
Eugene Humphrey
William A. Wright

INVENTOR.
Emerson C. Strange
per T. W. Porter
Atty

N. PETERS, Photo-Lithographer, Washington, D. C.

UNITED STATES PATENT OFFICE.

EMERSON C. STRANGE, OF TAUNTON, MASSACHUSETTS.

COMBINED VISE AND DRILL.

SPECIFICATION forming part of Letters Patent No. 373,539, dated November 22, 1887.

Application filed August 8, 1887. Serial No. 246,397. (No model.)

*To all whom it may concern:*

Be it known that I, EMERSON C. STRANGE, of Taunton, in the county of Bristol and State of Massachusetts, have invented a new and useful Improvement in Vises, which will, in connection with the accompanying drawings, be hereinafter fully described, and specifically defined in the appended claims.

Figure 1:
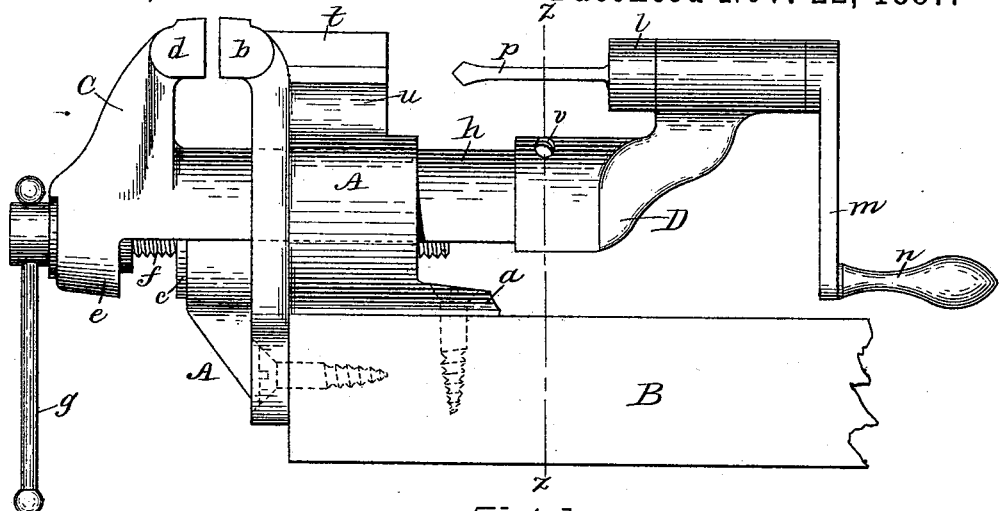
Figure 2:
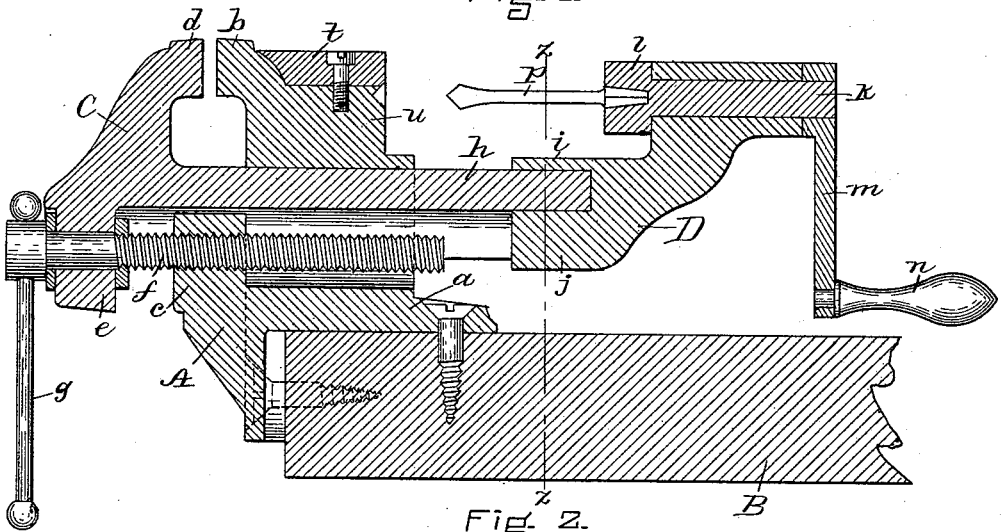

In said drawings, Figure 1 is a side elevation of a combined vise and drill embodying my invention. Fig. 2 is a longitudinal vertical section taken through Fig. 1, as on line X, Fig. 2; and Fig. 3 is a sectional elevation, the section being taken on line Z, Figs. 1, 2, and the elevation as viewed from the right in that figure.

My invention relates to combined vises and drills; and it consists in features of novelty hereinafter fully described, and pointed out in the claims.

Referring again to the drawings, A represents the back jaw, which is stationary, it being formed with a base, a, to furnish a support upon bench B, also with the jaw proper, b, the nut-like part c, and the drill platen or table u. The front traveling jaw, C, is formed with the jaw proper, d, the lug e, in which the actuating-screw f is journaled, and with the slide or bar h, which extends through jaw A, and is thereby held and guided in proper relation to said jaw A. The screw f is, by its head and a collar on the opposite side of lug e, held from lineal displacement in jaw C; hence when the screw is rotated (by its lever g) jaw C is moved toward or away from jaw A, according to the direction in which said screw is actuated.

Figure 3:
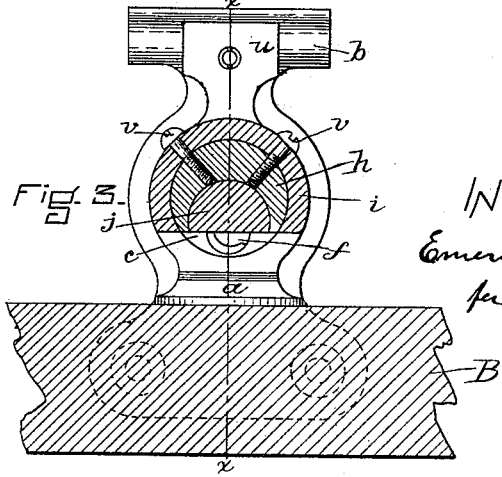

D is an arm or drill-stock, formed at its lower end with a top lip, i, and bottom lip, j, arranged to receive bar h of jaw C, between them, as shown in Figs. 2, 3, the stock being secured in place by screws v.

In the upper portion of D is journaled the short arbor k, in the head l of which is secured the drill P, said arbor being actuated by handle n, through crank m, when the drill is to be rendered operative, the thing to be drilled being placed against and supported by the rear face, u, of jaw A, which serves as a drill platen or support. Said platen may be homogeneous with jaw A, as shown in Fig. 3, or it may be provided with a steel cap, t, as shown in Figs. 1 and 2.

I do not herein claim, broadly, the combination of a vise and drill, as such a tool was patented to me on April 19, 1887, by United States Patent No. 361,600; but in said patent the vise-frame is formed with the front jaw at one end and with the drill journaled in an upturned arm at the opposite end, while the back movable jaw serves as the drill-platen, while in my present invention the back jaw is the fixed or main jaw and the front jaw is not only the traveling jaw, but it carries the drill and its arbor, by which construction the drill and its crank are brought toward the front of the bench in the act of feeding the drill to the work.

It will be obvious that the vise shown in the accompanying drawings may be made a pivotal vise, if desired; but as the drill-platen is always in a fixed position near the front of the bench, a pivotal capacity in the vise would not in most cases be of value or convenience; and as constructed, the drill-stock D is removable, which is of importance in case of repairs or for other obvious purposes. It will be obvious that the details of construction may be varied without departing from the spirit of my invention.

I claim as my invention—

1. As an improvement in combined vises and drills, the back jaw formed to be secured to the bench or support, and the front jaw formed and arranged to travel relatively to the back jaw and provided with an actuating-screw, and having a bar or slide extending through the fixed back jaw, and also having a raised rear extension with a drill-arbor journaled therein and provided with means to rotate it, substantially as specified.

2. As an improvement in combined vises and drills, the combination of the fixed back jaw, the traveling front jaw having a bar or slide extending through the back jaw, a screw to actuate said front jaw, and a raised rearward extension secured to said slide and having a drill-arbor journaled in said extension and provided with means to rotate it, substantially as specified.

EMERSON C. STRANGE.

Witnesses:
I. C. DICKERMAN,
GEO. P. DOHERTY.